US 6,655,626 B2

(12) United States Patent  (10) Patent No.: US 6,655,626 B2
Snyder  (45) Date of Patent: Dec. 2, 2003

(54) BELT RETRACTOR FOR A VEHICLE SAFETY BELT

(75) Inventor: Lloyd Snyder, Oxford, MI (US)

(73) Assignee: TRW Occupant Restraint Systems GmbH & Co. KG, Alfdorf (DE)

(*) Notice: Subject to any disclaimer, the term of this patent is extended or adjusted under 35 U.S.C. 154(b) by 69 days.

(21) Appl. No.: 09/998,965

(22) Filed: Nov. 15, 2001

(65) Prior Publication Data
US 2002/0079397 A1 Jun. 27, 2002

(30) Foreign Application Priority Data
Nov. 16, 2000 (DE) .......................... 200 19 468

(51) Int. Cl.[7] ............................................. B65H 75/48
(52) U.S. Cl. .................................. 242/382.2; 200/573
(58) Field of Search ........................ 242/382.2, 382.4; 280/806; 297/478, 480; 200/61.58 B, 573

(56) References Cited

U.S. PATENT DOCUMENTS

| 4,915,321 A | * | 4/1990 | Asfour ..................... 242/382.2 |
| 4,948,066 A | * | 8/1990 | Matsumoto et al. ..... 242/382.2 |
| 5,474,247 A | * | 12/1995 | Bareiss .................... 242/382.2 |
| 5,501,293 A | | 3/1996 | Borjesson et al. |
| 5,507,447 A | * | 4/1996 | Corrion et al. .......... 242/382.2 |
| 5,518,197 A | * | 5/1996 | Gray ....................... 242/382.2 |
| 5,772,145 A | | 6/1998 | Bareiss et al. |
| 5,931,401 A | | 8/1999 | Rink |
| 6,109,556 A | | 8/2000 | Kopetzky et al. |

FOREIGN PATENT DOCUMENTS

| DE | 8410734 U1 | 9/1984 |
| DE | 3603273 A1 | 8/1987 |
| DE | 29520425 U1 | 6/1996 |
| DE | 19648515 A1 | 5/1998 |
| EP | 0298123 A1 | 1/1989 |
| EP | 0718159 A1 | 6/1996 |
| EP | 0858936 A2 | 8/1998 |
| EP | 0858936 A2 | 8/1999 |

* cited by examiner

Primary Examiner—William A. Rivera
(74) Attorney, Agent, or Firm—Tarolli, Sundheim, Covell & Tummino L.L.P.

(57) ABSTRACT

A belt retractor for a vehicle safety belt includes a frame, a belt spool rotatably mounted in the frame, and a locking mechanism which is provided with a release disk and by means of which the belt spool can be blocked against rotation in the frame. The belt retractor further includes a control disk as well as a reduction gear that couples the belt spool with the control disk. A rocking lever is provided which is adapted to be pivoted by the control disk between a release position in which it does not cooperate with the release disk, and a blocking position in which it engages in the release disk, whereby the belt spool can be blocked against rotation. A switch is provided which is adapted to be actuated by the control disk when a predetermined amount of belt webbing has been drawn off the belt spool and the control disk has been turned into a predetermined position.

9 Claims, 9 Drawing Sheets

BELT RETRACTOR FOR A VEHICLE SAFETY BELT

TECHNICAL FIELD

The invention relates to a belt retractor for a vehicle safety belt. The belt retractor comprises a frame, a belt spool rotatably mounted in the frame, a locking mechanism which is provided with a release disk and by means of which the belt spool can be blocked against rotation in the frame, and a control disk as well as a reduction gear that couples the belt spool with the control disk.

BACKGROUND OF THE INVENTION

A belt retractor of that kind is known from German Utility Model 298 20 086. The control disk serves for operating a so-called child protection. When the child protection is activated, the belt webbing can no longer be drawn off the belt retractor, but only rolled up. This makes it possible to solidly connect a child's safety seat with the vehicle. In order to activate the child protection function, the belt webbing is drawn off the belt spool almost completely. The child protection is automatically deactivated when the belt webbing is again rolled up on the belt spool almost completely.

There have been recent attempts to integrate further functions in the belt retractor. Special attention is paid to the possibility of performing a so-called occupant sensing, i.e. obtaining information on whether or not the vehicle seat associated with the belt retractor is occupied. This may be done by sensing whether or not the safety belt is used. It is presupposed here that a vehicle occupant does use the corresponding safety belt. When it is determined that a vehicle occupant is present, various safety systems like a belt tensioner may be cleared. When the safety belt is not used, the belt tensioner is deactivated in a vehicle accident as there are no advantages to be got from an unused belt being tensioned.

BRIEF SUMMARY OF THE INVENTION

It is the object of the invention to further develop a belt retractor of the kind initially mentioned to the effect that both a child protection function and an occupant sensing may be realized at low expenditure.

This is achieved in a belt retractor which comprises a frame, a belt spool rotatably mounted in the frame, and a locking mechanism which is provided with a release disk and by means of which the belt spool can be blocked against rotation in the frame. The belt retractor further comprises a control disk as well as a reduction gear that couples the belt spool with the control disk. A rocking lever is provided which is adapted to be pivoted by the control disk between a release position in which it does not cooperate with the release disk, and a blocking position in which it engages in the release disk, whereby the belt spool can be blocked against rotation. A switch is provided which is adapted to be actuated by the control disk when a predetermined amount of belt webbing has been drawn off the belt spool and the control disk has been turned into a predetermined position. Thus, the belt retractor proposed combines the two functions child protection and occupant sensing in that a single control disk both switches the rocking lever, by means of which the child protection function may be realized, and directly or indirectly actuates the switch by means of which it can be sensed whether the belt webbing has been drawn off the belt retractor, which indirectly indicates that a vehicle occupant is present.

Preferably, the switch is a microswitch with a contact element able to be actuated by a ramp surface on the control disk. This results in minimum construction expenditure since the microswitch just needs to be attached to the belt retractor such that it is immediately actuated by the control disk.

Preferably, the rocking lever cooperates with a dead-center spring such that the blocking position and the release position are situated on the one and the other side of the dead center, respectively. In this manner, there is provided a bistable rocking lever which is adapted to be easily switched to and fro between the one and the other position by the control disk. For the purpose, two stops on the control disk may preferably be used, which are adapted to cooperate with the rocking lever. Especially low construction expenditure results when a spring shackle being integrally formed on the rocking lever is used for realizing the dead-center spring.

According to a preferred embodiment of the invention, there is provided a reversible switch which is adapted to sense the switching state of the rocking lever. This makes it possible to electronically interrogate the status of the belt retractor in respect of the child protection function. For example, a gas bag may be deactivated in this manner when a child safety seat is attached on the vehicle front seat by means of the belt retractor.

The reversible switch may for instance be disposed such that its contact element is directly actuated by the rocking lever when the latter is in the position for the child protection function, for instance. As an alternative, it may be provided that the rocking lever is actuated indirectly, for instance by a drag disk which is coupled with the control disk and comprises a ramp surface which is adapted to cooperate with the contact element of the rocking lever. This drag disk comprises a gate in which a spigot mounted on the control disk engages, so that the control disk entrains the drag disk whenever the spigot abuts at one end of the cam. Since the rocking lever is actuated indirectly, it is possible to mount it at a suitable location on the belt retractor remote from the rocking lever.

Advantageous configurations of the invention may be taken from the subclaims.

DETAILED DESCRIPTION OF THE PREFERRED EMBODIMENTS

Figure 1:
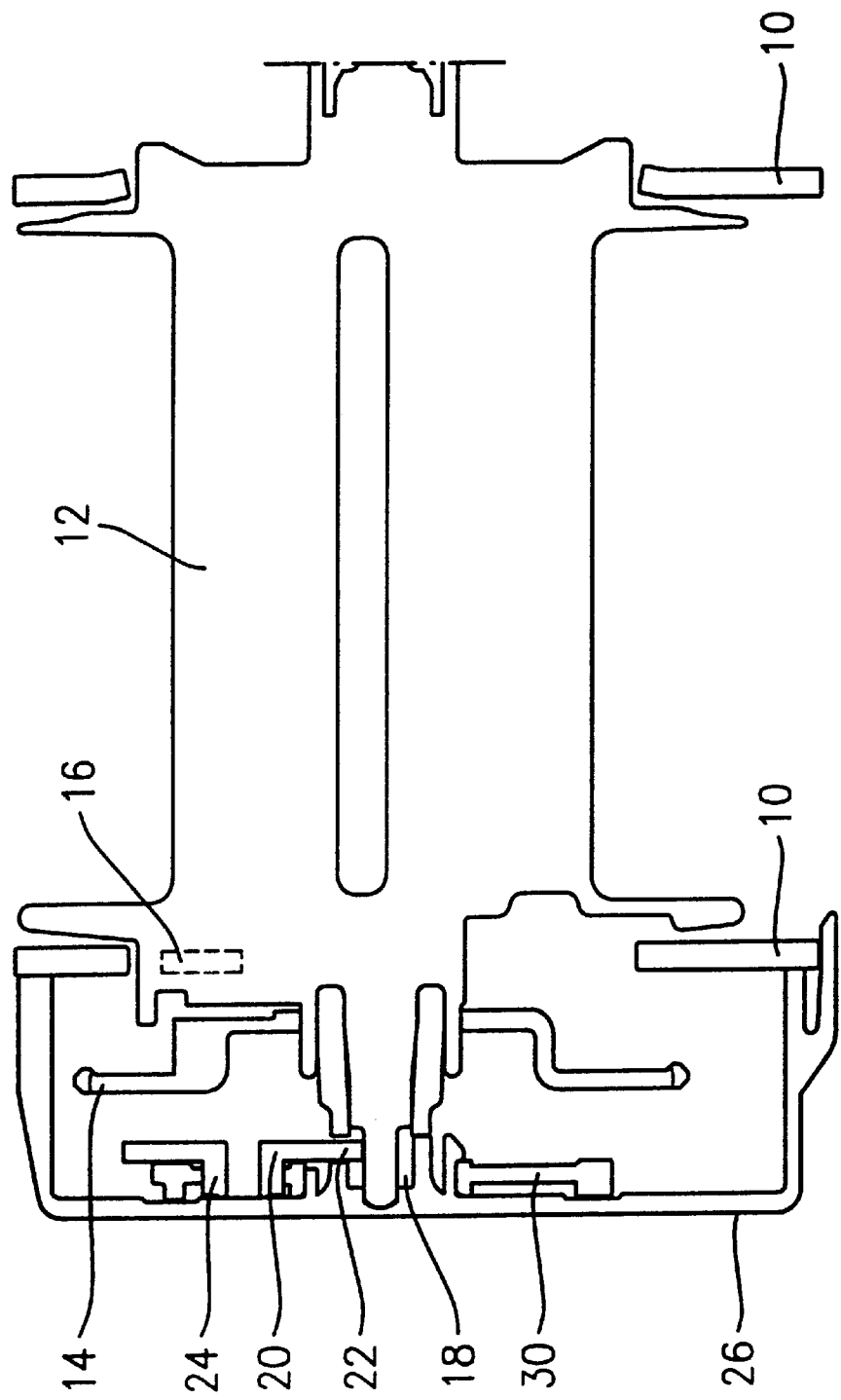
FIG. 1 is a schematic view of a belt retractor according to the invention.

FIG. 1 schematically shows a belt retractor. It contains a frame 10 in which a belt spool 12 is rotatably supported. On the belt spool 12, there is mounted a release disk 14 which is adapted to cooperate with a schematically indicated blocking pawl 16. The blocking pawl 16 is adapted to block the belt spool 12 against a rotation in a belt webbing unwinding direction. The release disk 14 and the blocking lever 16 are part of a conventional locking mechanism which is adapted to respond in a vehicle-sensitive or a belt webbing-sensitive manner. The concrete configuration of such a locking mechanism is known to the person skilled in the art; thus, it will not be discussed further herein. For understanding the invention, it is merely important to know that the locking mechanism may be triggered by a relative rotation between the belt spool 12 and the release disk 14. This relative rotation may be caused in that the release disk is arrested when the belt spool rotates in the belt webbing unwinding direction.

Figure 2:
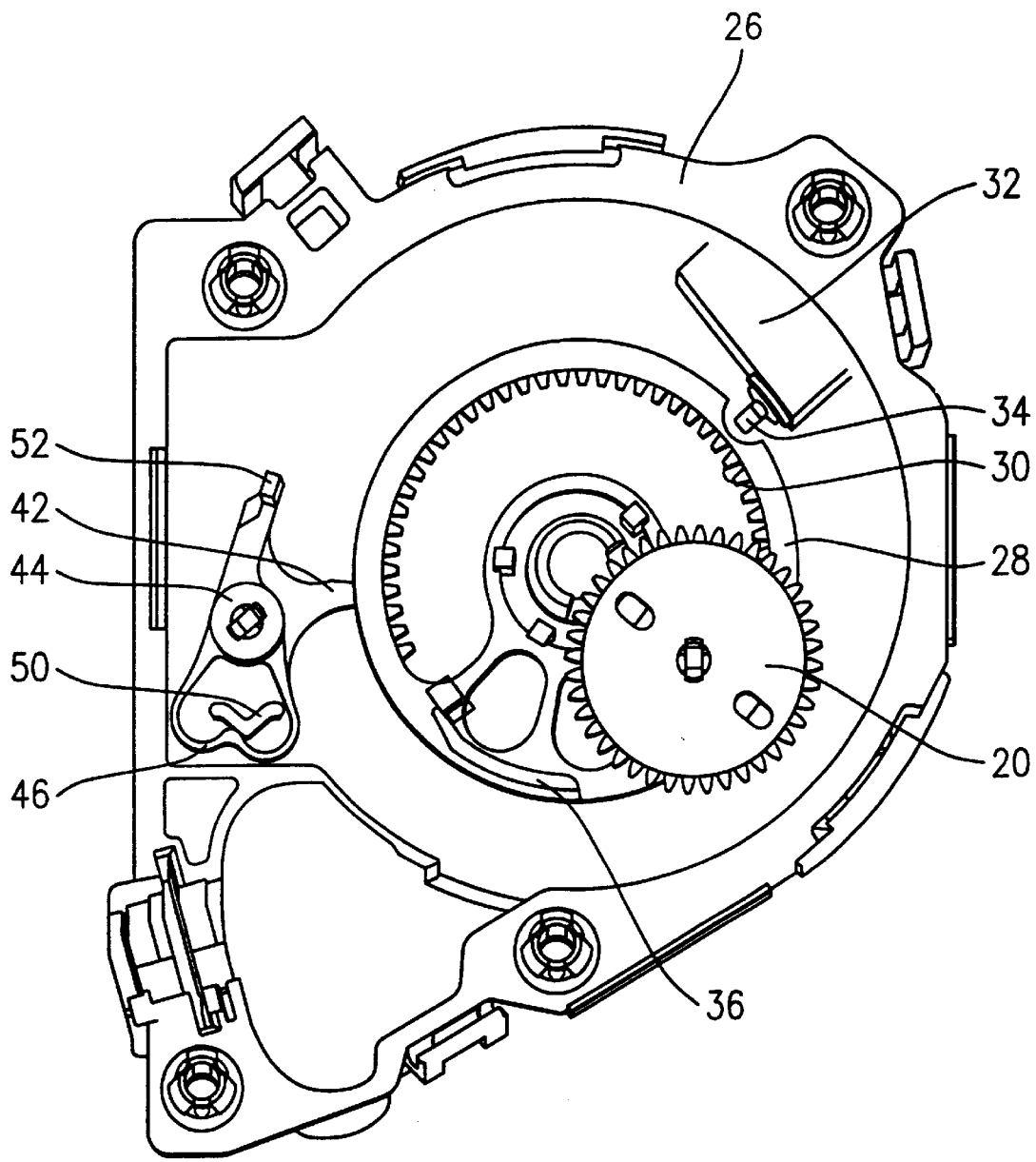
FIG. 2 shows a cover cap of the belt retractor of FIG. 1 together with some components mounted therein and the rocking lever being in the blocking position.

A pinion 18 (see FIG. 1) cooperating with a reduction gear wheel 20 (see also FIGS. 2 and 3) is non-rotatably connected with the belt spool 12. The reduction gearwheel 20 comprises a first tooth section 22 which has a large diameter, as well as a second tooth section 24 which has a small diameter and is fixedly connected with the first tooth section. The gearwheel 20 is rotatably supported in a cover 26 which is mounted on frame 10 of the belt retractor.

A control disk 28 which is rotatably supported in the cover 26, is connected with the second tooth section 24 of the gearwheel 20, its axis of rotation coinciding with the axis of rotation of the belt spool 12. The reduction gear constituted by the gearwheel 20, the pinion 18 and a toothing 30 of the control disk 28 reduces a rotation of the belt spool 12 such that the control disk 28 performs approximately half a revolution when the belt webbing is being completely drawn off belt spool 12.

In order to realize an occupant sensing function, a switch 32 formed as a microswitch with a contact element 34 is provided in the housing 26. The contact element 34 has associated therewith a ramp surface 36 which is formed on the control disk 28. The ramp surface 36 is disposed on the control disk 28 such that the switch 32 is actuated when the belt webbing is almost completely rolled up on the belt spool. As soon as a predetermined amount of belt webbing is drawn off and the control disk 28 has turned in the direction designated by arrow P in FIG. 3, the contact element 34 is released by the ramp surface 36 so that the switch 32 is opened. This state of the switch may be interpreted such that a vehicle occupant has taken the vehicle seat associated with the safety belt and has fastened the belt.

The control disk 28 is further provided with two stops 38, 40 (see FIGS. 3 and 4) which are adapted to cooperate with a rocker arm 42 of a rocking lever 44. The rocking lever 44 is pivotally supported on the cover 26 and may assume two bistable positions. For the purpose, the rocking lever 44 is provided with an integrally formed spring shackle 46 which comprises an apex 48. The spring shackle 46 cooperates with a projection 50 formed on the cover 26 of the belt retractor.

The rocking lever 44 is further provided with a blocking arm 52 which may cooperate with a toothing 54 formed on the periphery of the release disk 14. The rocker arm 42, the blocking arm 52 as well as the spring shackle 46 are configured such that the center of gravity of the rocking lever 44 lies on its axis of rotation. In this manner, it is prevented that accelerations acting on the belt retractor may cause undesired switching of the rocking lever.

Figure 3:
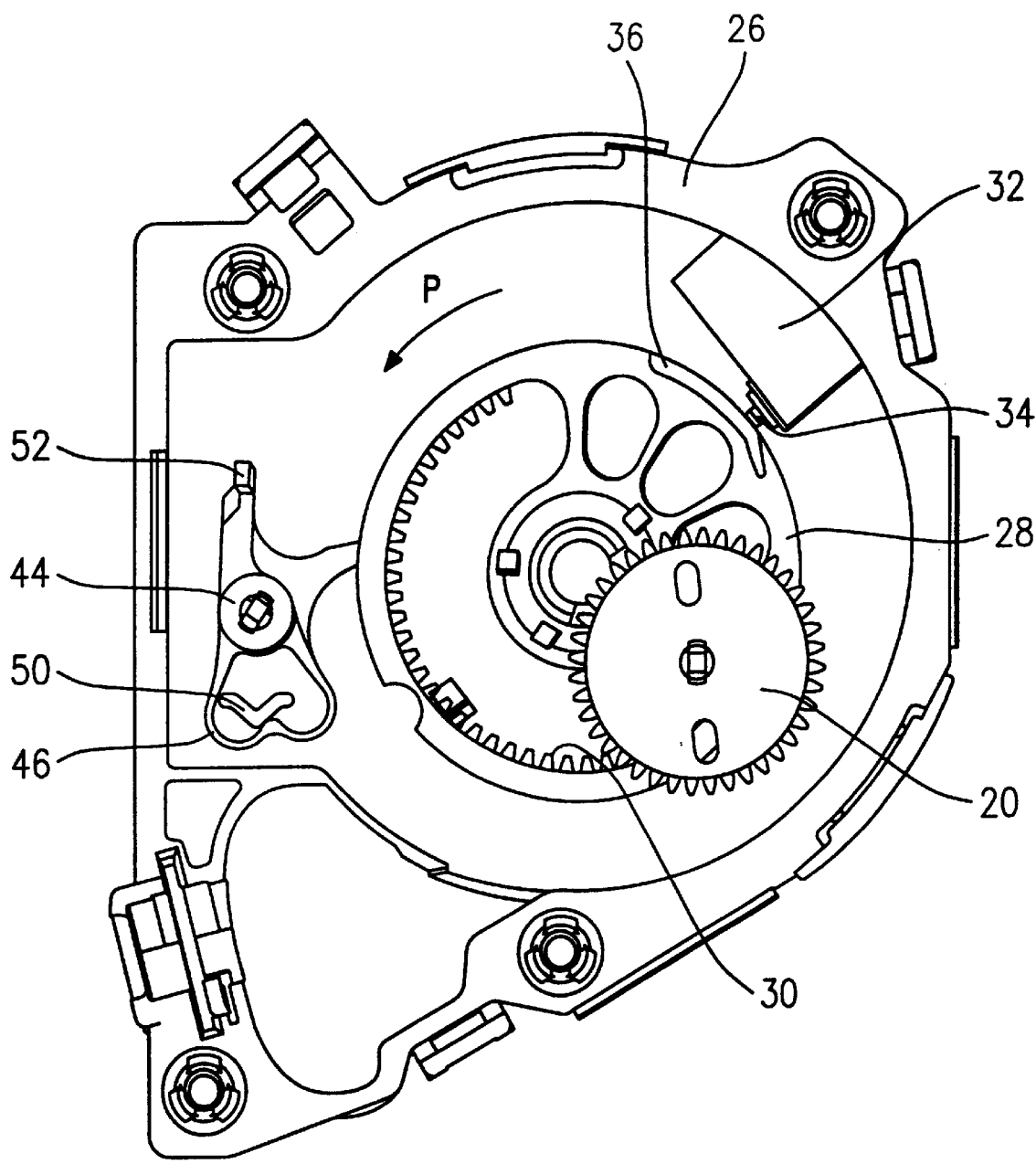
FIG. 3 is a view corresponding to that of FIG. 2 with the rocking lever in the release position.
Figure 4:
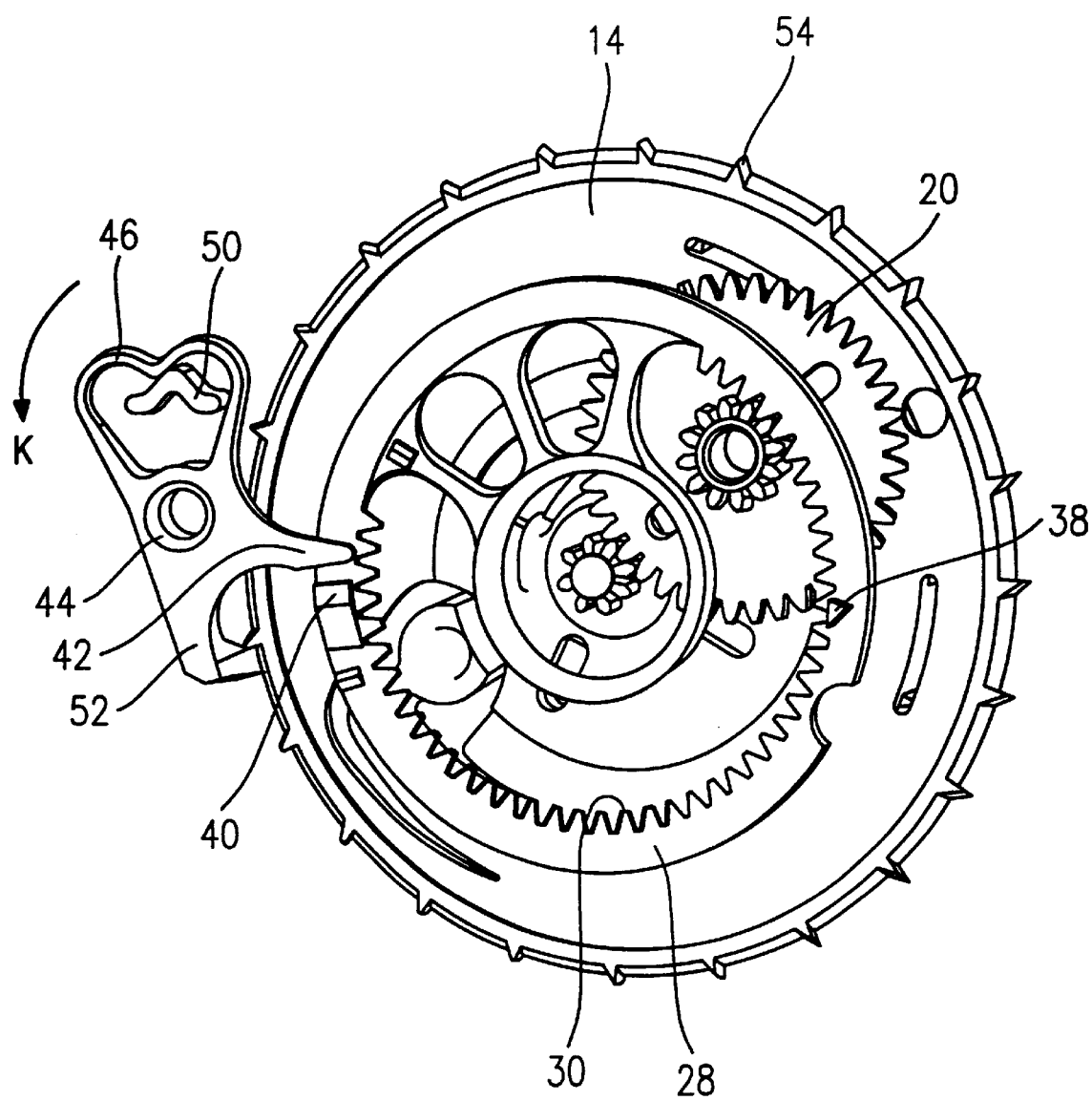
FIG. 4 is a schematic view of the release disk, the control disk and the rocking lever shortly after switching from the release position into the blocking position.
Figure 5:
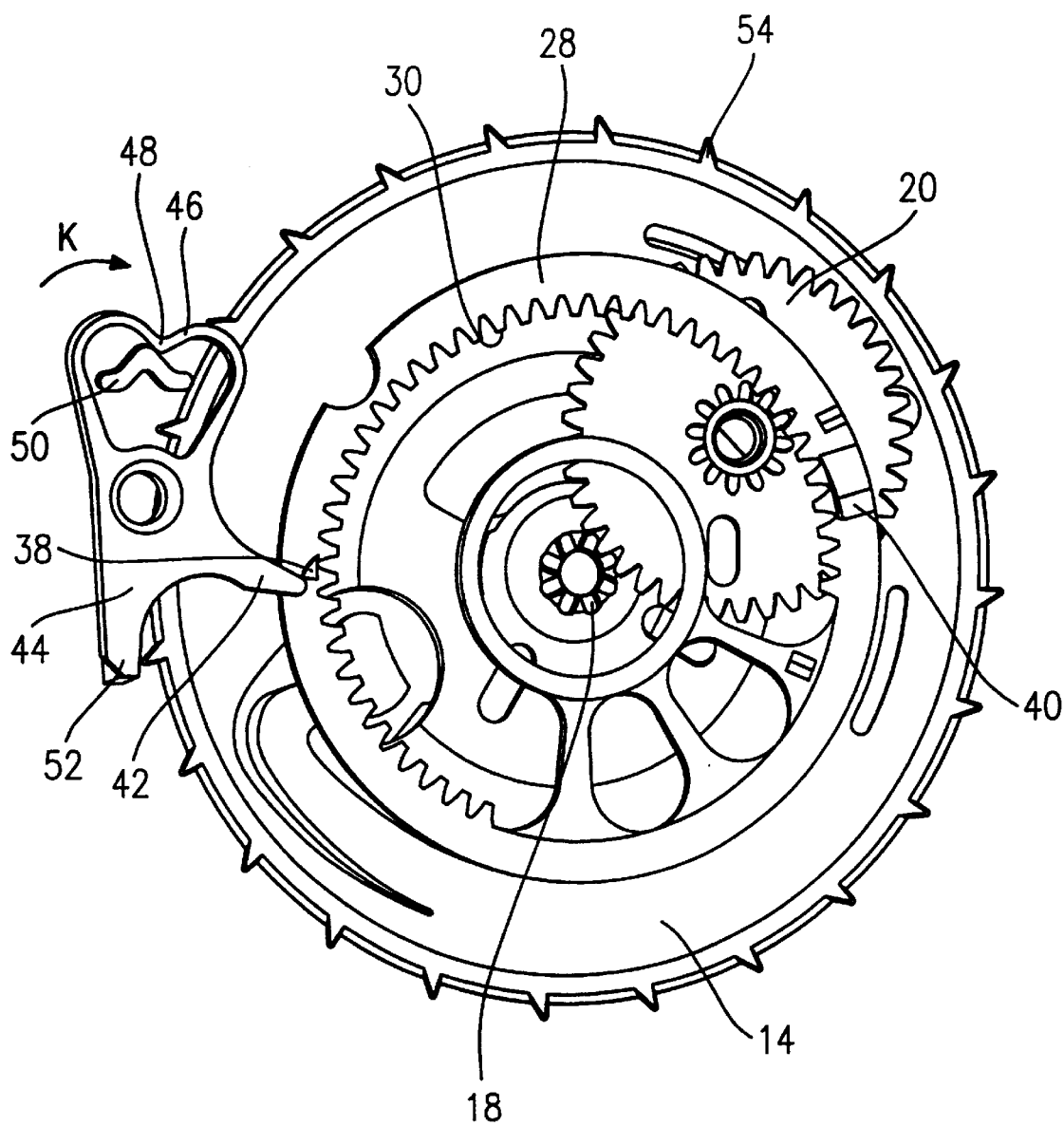
FIG. 5 is a view corresponding to that of FIG. 4 shortly after switching of the rocking lever from the blocking position into the release position.

In FIGS. 3 and 5, the rocking lever 44 is shown in its release position in which it does not cooperate with the toothing 54 of the release disk 14. Therefore, belt webbing may freely be drawn off the belt spool of the belt retractor. When the belt webbing is completely drawn off, the stop 40 comes into abutment at the rocker arm 42 of the rocking lever 44, so that the rocking lever 44 is pivoted in the direction of arrow K of FIG. 4 with continued rotation of the control disk 28 by means of the stop 40. In the process, the apex 48 of the spring shackle 46 slips over the projection 50, so that the rocking lever 44 is in its stable blocking position. The rocking lever which has just been pivoted into its blocking position is shown in FIG. 4. In the blocking position, the blocking arm 52 engages in the toothing 54 of the release disk 14. Due to the sawtooth-shaped teeth of the toothing 54, the release disk 14 may slip through under the blocking arm 54 during a rotation which corresponds to the winding-up of the belt webbing onto the belt spool. However, if one tries to draw belt webbing off the belt spool, the blocking arm 52 blocks the release disk 14, so that it lags behind the rotation of the belt spool. This activates the locking mechanism of the belt retractor, so that the belt spool is blocked against a further rotation in the belt unwinding direction. In this manner a child protection function is achieved. Only when so much belt webbing has been wound onto the belt spool 12 that the stop 40 cooperates with the blocking arm 42, the rocking lever 44 is pivoted in the direction of arrow K of FIG. 5 from the blocking position into the release position, the apex 48 again slipping over the projection 50. Thus, the child protection function is canceled out again and the belt webbing may freely be drawn off the belt spool. The rocking lever which has just been pivoted by the stop 38 into the release position is shown in FIG. 5. The stop 38 is usually disposed on the control disk 28 such that switching-over from the blocking position into the release position is performed shortly before the belt webbing is completely received on the belt spool.

Figure 6:
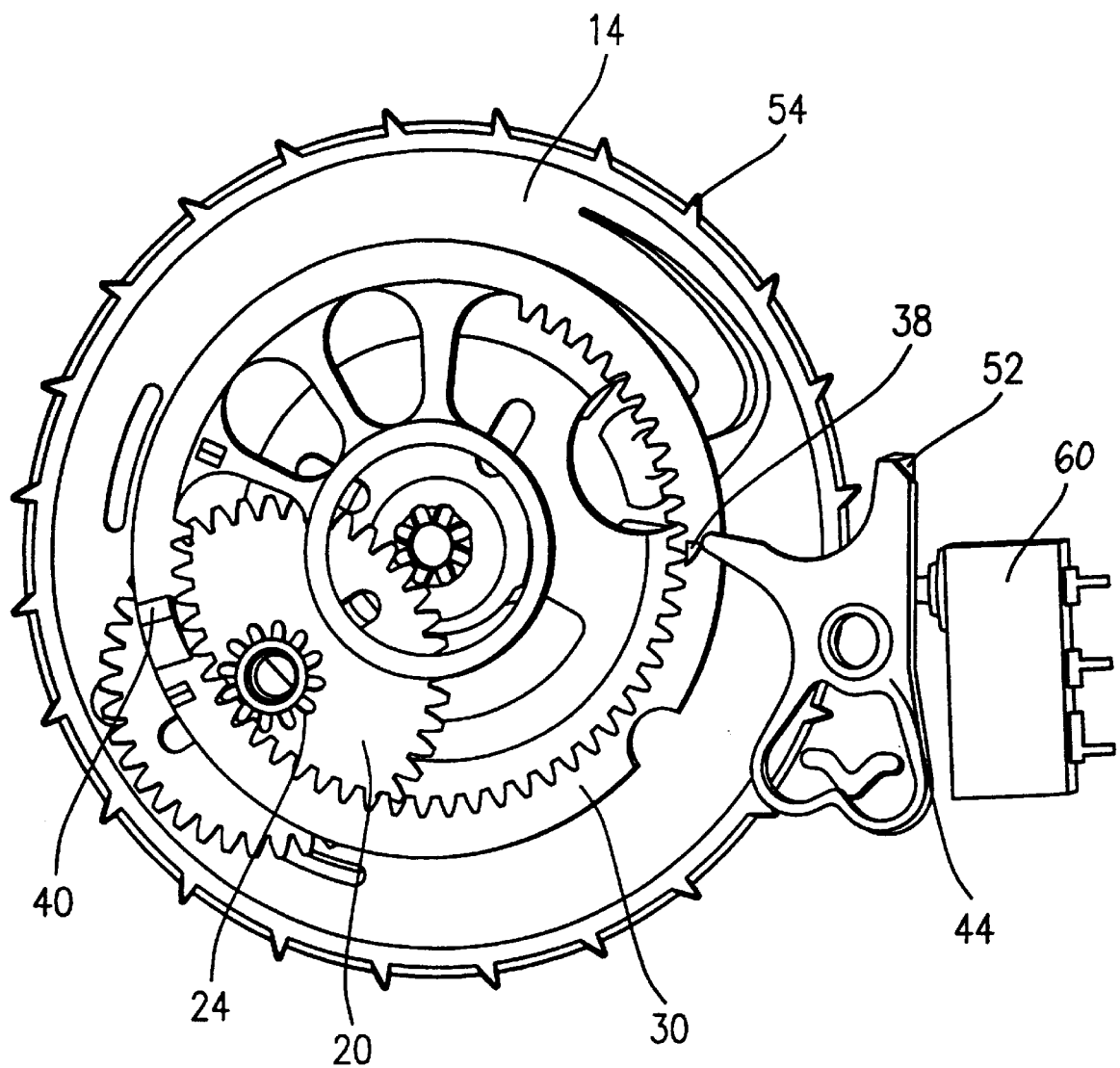
FIG. 6 is a view of the release disk, the control disk and the rocking lever of a belt retractor according to a second embodiment, the rocking lever being in the release position.
Figure 7:
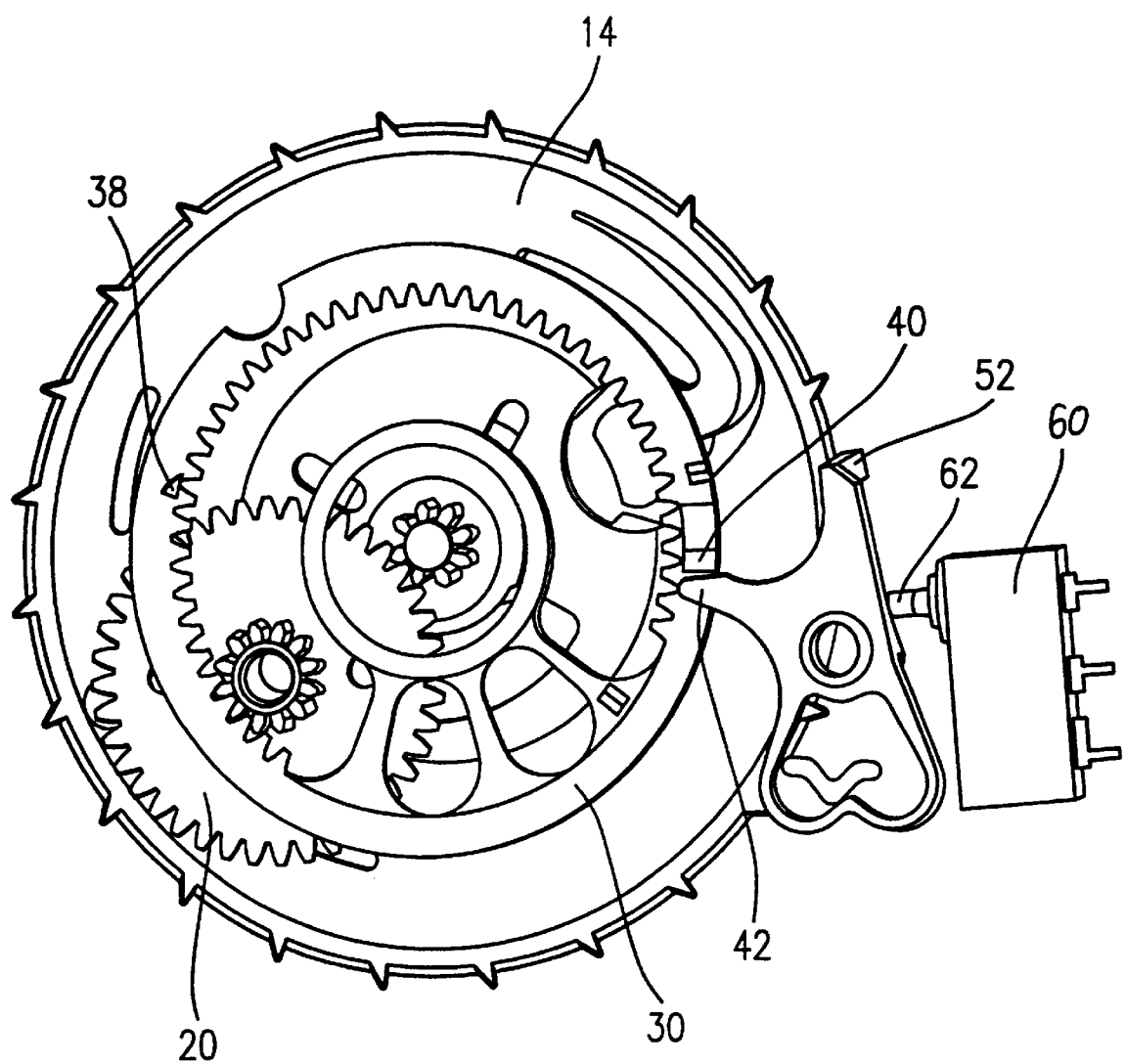
FIG. 7 is a view corresponding to that of FIG. 6 with the rocking lever in the blocking position.

In FIGS. 6 and 7, the release disk 14, the control disk 28 as well as the rocking lever 44 of a belt retractor according to a second embodiment are shown. The second embodiment substantially corresponds to the first embodiment, a reversible switch 60 additionally being provided in the second embodiment, which is configured as a microswitch with a contact element 62 here. The reversible switch 60 is disposed in the cover 26 (not represented in FIGS. 6 and 7) of the belt retractor in such a manner that it is actuated when the rocking lever 44 is in the release position (see FIG. 6) and released when the rocking lever 44 is in the blocking position (see FIG. 7). This makes it possible to interrogate the switching state for the child protection function externally.

Figure 8:
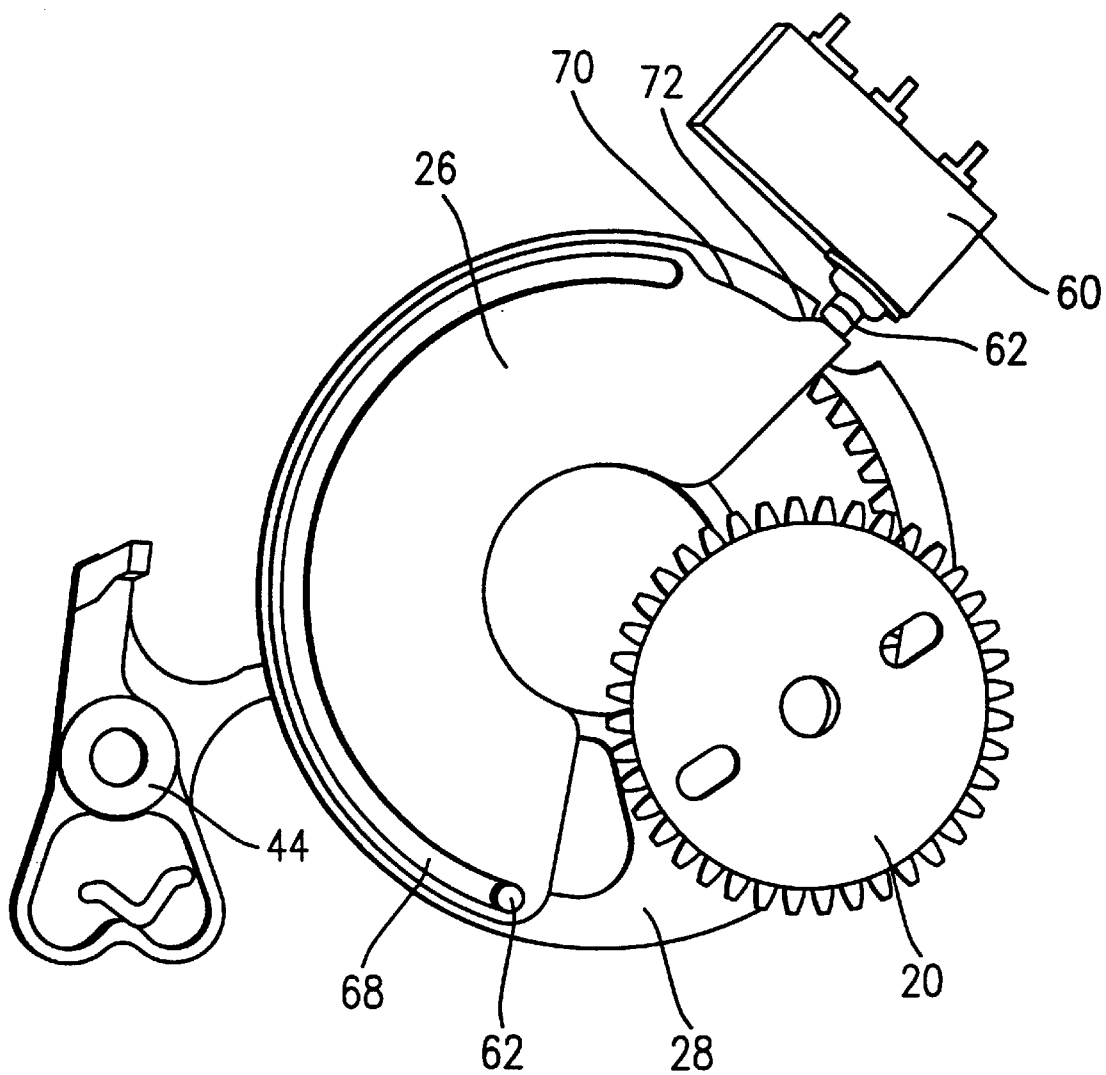
FIG. 8 is a schematic view of the control disk and the rocking lever of a belt retractor according to a third embodiment in a first state.
Figure 9:
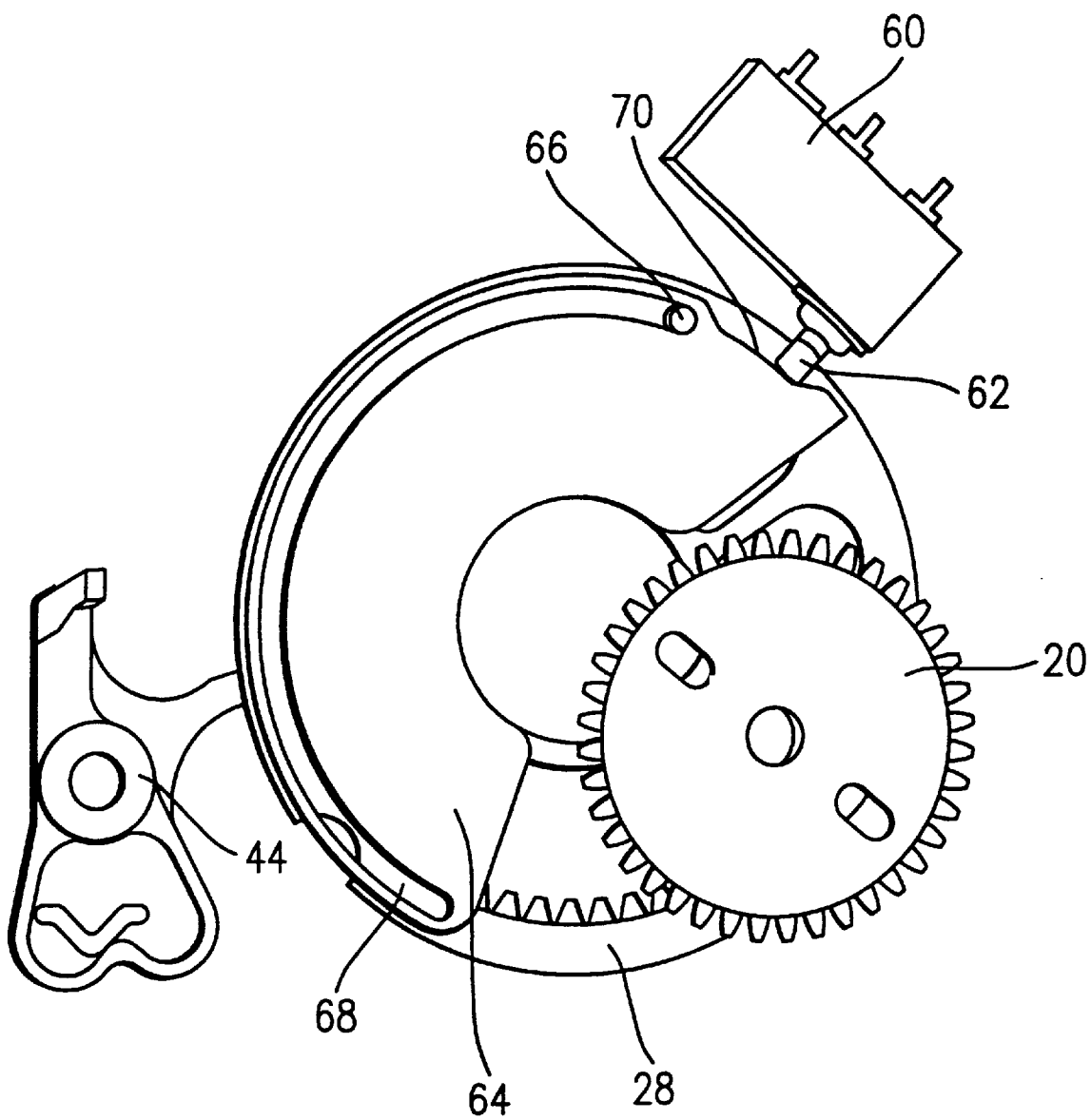
FIG. 9 shows in a view corresponding to that of FIG. 8 the control disk and the rocking lever in a second state.

In FIGS. 8 and 9, the control disk 28 and the switch 60 for a belt retractor according to a third embodiment are shown. In contrast to the second embodiment, the reversible switch 60 is no longer actuated directly by the rocking lever 44, but indirectly. A drag disk 64 is provided which is slidably supported on the control disk 28. The control disk 28 is provided with a spigot 66 which engages a gate 68 of the drag disk 64. The spigot 66 on the control disk 28 and the gate 68 in the drag disk 64 are coordinated to each other such that a recess 70 in the drag disk lies opposite the contact element 62 of the microswitch only when the rocking lever 64 is in its release position in which the child protection function is not active (see FIG. 9).

However, when the control disk 28 is turned so far that it brings the rocking lever into the blocking position (see FIG. 8), the spigot 66 comes into abutment at one end of the gate 68, so that a ramp surface 72 provided at the end of the recess 70 cooperates with the contact element 62 of the microswitch 60 and actuates same. The drag disk 64 remains in this position, in which the switch 60 is actuated, until the spigot 66 comes into abutment at the other end of the gate 68 (see the state represented in FIG. 9) and entrains the drag disk 64 in clockwise direction, so that the contact element 62 lies again in the region of the recess 70.

What is claimed is:

1. A belt retractor for a vehicle safety belt, said belt retractor comprising:
   a frame,
   a belt spool rotatably mounted in said frame,
   a locking mechanism which is provided with a release disk and by means of which said belt spool can be blocked against rotation in said frame,
   a control disk as well as a reduction gear that couples said belt spool with said control disk,
   a rocking lever being provided which is adapted to be pivoted by said control disk between a release position in which it does not cooperate with said release disk, and a blocking position in which it engages in said release disk, whereby said belt spool can be blocked against rotation, and
   a switch being provided which is adapted to be actuated by said control disk when a predetermined amount of belt webbing has been drawn off said belt spool and said control disk has been turned into a predetermined position,
   wherein said rocking lever cooperates with a dead-center spring such that said blocking position and said release position are situated on the one and the other side of said dead center, respectively,
   wherein said rocking lever is provided with an integrally formed spring shackle which cooperates with a projection on said belt retractor.

2. A belt retractor for a vehicle safety belt, said belt retractor comprising:
   a frame,
   a belt spool rotatably mounted in said frame,
   a locking mechanism which is provided with a release disk and by means of which said belt spool can be blocked against rotation in said frame,
   a control disk as well as a reduction gear that couples said belt spool with said control disk,
   a rocking lever being provided which is adapted to be pivoted by said control disk between a release position in which it does not cooperate with said release disk, and a blocking position in which it engages in said release disk, whereby said belt spool can be blocked against rotation, and
   a switch being provided which is adapted to be actuated by said control disk when a predetermined amount of belt webbing has been drawn off said belt spool and said control disk has been turned into a predetermined position,
   wherein a reversible switch is provided which is adapted to sense said switching states of said rocking lever.

3. The belt retractor according to claim 2, wherein said reversible switch is a microswitch having a contact element.

4. The belt retractor according to claim 3, wherein said contact element of said reversible switch is adapted to be directly actuated by said rocking lever.

5. The belt retractor according to claim 3, wherein a drag disk is provided which is coupled with said control disk and comprises a ramp surface which is adapted to cooperate with said contact element of said reversible switch.

6. The belt retractor according to claim 5, wherein said drag disk is provided with a gate and said control disk is provided with a spigot engaging said gate, said control disk entraining said drag disk whenever said spigot abuts at one end of said gate.

7. A belt retractor for a vehicle safety belt, said belt retractor comprising:
   a frame,
   a belt spool rotatably mounted in said frame,
   a locking mechanism which is provided with a release disk and by means of which said belt spool can be blocked against rotation in said frame,
   a control disk as well as a reduction gear that couples said belt spool with said control disk,
   a rocking lever being provided which is adapted to be pivoted by said control disk between a release position in which it does not cooperate with said release disk, and a blocking position in which it engages in said release disk, whereby said belt spool can be blocked against rotation, and
   a switch being provided which is adapted to be actuated by said control disk when a predetermined amount of belt webbing has been drawn off said belt spool and said control disk has been turned into a predetermined position,
   wherein said switch is a microswitch with a contact element which is adapted to be actuated by a ramp surface on said control disk.

8. A belt retractor for a vehicle safety belt, said belt retractor comprising:
   a frame,
   a belt spool rotatably mounted in said frame,
   a locking mechanism which is provided with a release disk and by means of which said belt spool can be blocked against rotation in said frame,
   a control disk as well as a reduction gear that couples said belt spool with said control disk,
   a rocking lever being provided which is adapted to be pivoted by said control disk between a release position in which it does not cooperate with said release disk, and a blocking position in which it engages in said release disk, whereby said belt spool can be blocked against rotation, and
   a switch being provided which is adapted to be actuated by said control disk when a predetermined amount of belt webbing has been drawn off said belt spool and said control disk has been turned into a predetermined position,
   wherein said rocking lever cooperates with a dead-center spring such that said blocking position and said release position are situated on the one and the other side of said dead center, respectively.

9. A belt retractor for a vehicle safety belt, said belt retractor comprising:
   a frame,
   a belt spool rotatably mounted in said frame,
   a locking mechanism which is provided with a release disk and by means of which said belt spool can be blocked against rotation in said frame,
   a control disk as well as a reduction gear that couples said belt spool with said control disk, a rocking lever being provided which is adapted to be pivoted by said control disk between a release position in which it does not cooperate with said release disk, and a blocking position in which it engages in said release disk, whereby said belt spool can be blocked against rotation, and a switch being provided which is adapted to be actuated by said control disk when a predetermined amount of belt webbing has been drawn off said belt spool and said control disk has been turned into a predetermined position, wherein said control disk is provided with two stops which cooperate with said rocking lever and are adapted to bring it from said release position into said blocking position and vice versa.

* * * * *